UNITED STATES PATENT OFFICE 2,143,641

ADHESIVE COATING, BINDER, AND FILLER COMPOSITION

Harry Bennett and Joseph Starobin, New York, N. Y.; said Starobin assignor to said Bennett No Drawing. Application January 24, 1936, Serial No. 60,641

3 Claims. (Cl. 134—18)

The invention relates to a novel inorganic resin which may be produced in liquid or dry form and is suitable for use as a coating application to an article or substance, or as a binder, filler, stiffener, etc.

It has for an object the provision of a product of the nature of a colloidal, uninterrupted film-forming compound similar to organic resins but water-soluble and which, when applied as set forth, becomes an adherent transparent coating or film having a glossy appearance and is resistant to oils and greases; also, which shall be suitable as an adhesive for use with paper, textiles, rubber, linoleum, wood, leather, glass, ceramics, "Cellophane", metals, etc. as well as serving as a binder, filler, size, or loading material for paper, textiles, leather, wood, etc. It is useful, also, in stiffening paper, textiles, etc. For setting or waving hair it is also useful alone or with a small amount of a plasticizer.

We are aware that somewhat similar products have been proposed comprising inorganic compounds which are capable of forming highly viscous aqueous solutions in the presence of a moderate amount of water and which aqueous viscous solutions, upon being heated, may provide a substantially anhydrous or glass-like product. Various mixtures of such viscous aqueous solution-forming compounds with borates of alkaline metals have also been proposed, particularly of sodium metaphosphate or hexaphosphate therewith, also monobasic sodium phosphate; but in admixture with heat insulating material and formed under relatively high temperature conditions. However, the resulting compositions are not suitable for the purposes hereinbefore noted; nor do they possess the necessary stability in aqueous solution, crystallizing out therefrom after a short period, say a day or at most several days, depending on the temperature to which such solution is subjected.

It is a further object of the present invention to provide a compound of the viscous aqueous solution-forming materials and a borate, such that the aqueous solution thereof will not crystallize at room temperature over relatively long periods of time, and which will have pH values substantially indifferent to weak inorganic acids and alkalis, as well as their buffer salts. A dry product is obtained by solidifying the viscous aqueous compound by heating, say from 110° C. to 150° C.; and aqueous solutions thereof will likewise remain stable for weeks and months contrary to products of a similar nature as heretofore prepared.

We have found that in the preparation of a product possessing the aforesaid desirable characteristics, the proportions of the reagents, say from 150 to 300 parts of the viscous aqueous solution-forming material to 382 parts of the borate, and the temperature ranges, from 105° C. to 110° C., are rather critical; and that the desirable properties aforesaid may not be obtained unless these factors be substantially adhered to.

For example, in carrying out the invention, an aqueous solution of 382 parts of borax (sodium tetraborate) is prepared and similarly of 150 parts of anhydrous monosodium phosphate ($NaH_2PO_4$), or the equivalent of this reagent in hydrated form—all parts being by weight, and the total amount of water involved being 400 parts. The two solutions aforesaid are mixed together and heated to drive off uncombined water, the temperature being maintained substantially at 105–110° C. The reaction product thus obtained may be represented by the following formula:

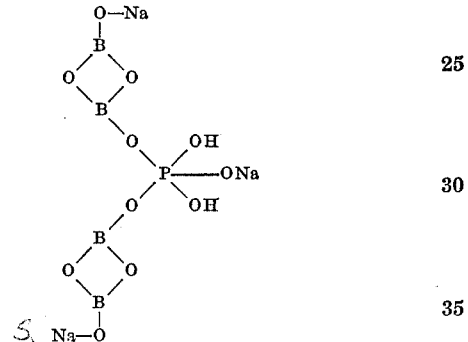

A suitable plasticizer such as glycerine, a polyglyceride, ethylene glycol, diethylene glycol, and other polyglycols or their water-soluble ethers may be added.

When heated for two hours at 105° C. the novel product loses from 2½ to 3½% water; and when heated from 110–120° C., it will lose about 18% and form a solid glass. Heating above 110° C. gradually converts the product into a fluffy powder, whose solutions in water retain the properties of the original substance. The viscous fluid product does not solidify nor crystallize at 0° C.; and it is not hygroscopic at humidities below 50%.

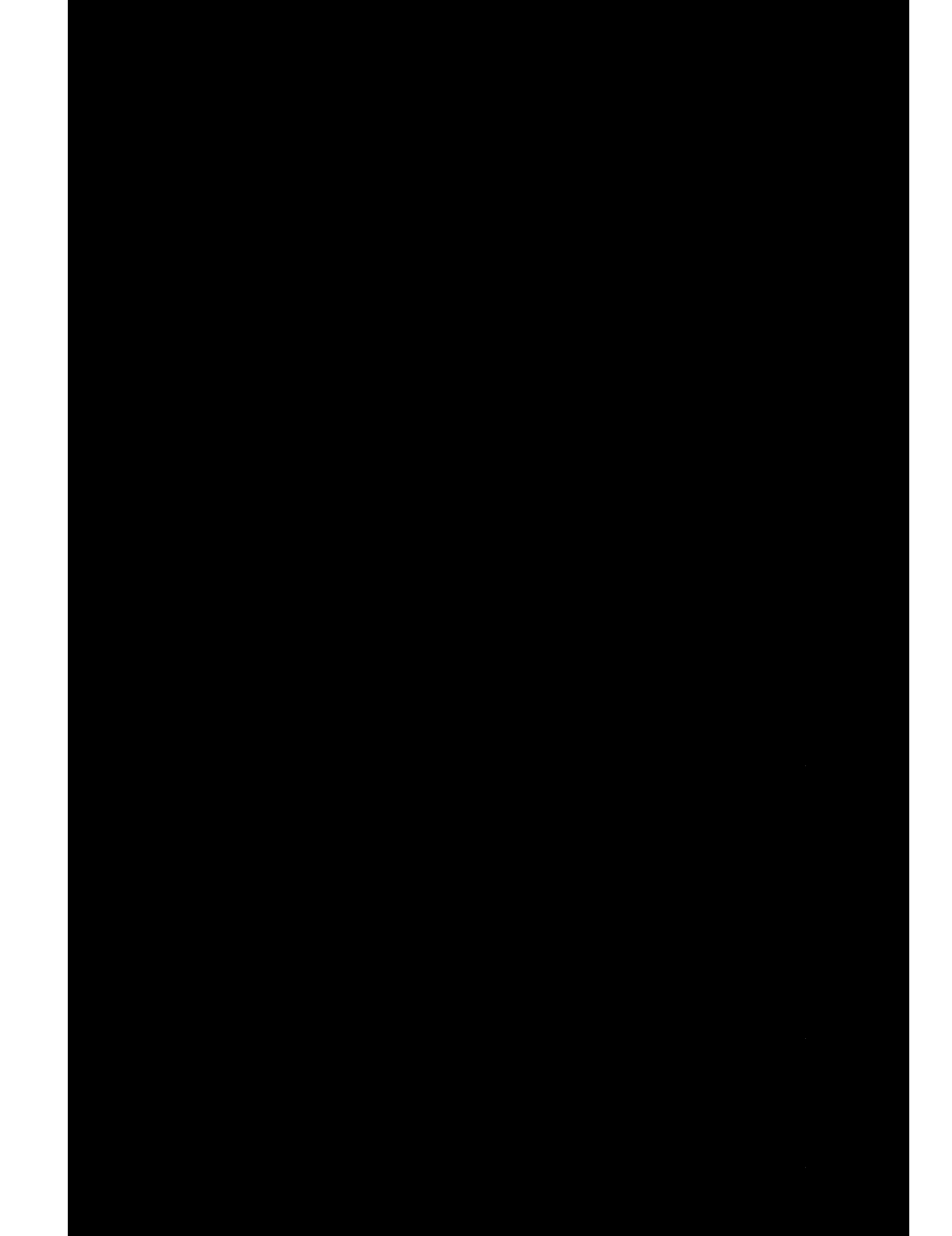

When exposed to the atmosphere under normal conditions, it will dry very quickly on a surface; and it loses about 3% moisture at room temperatures in 24 hours, about double this amount in 48 hours, and about 10% in 200 hours.